June 28, 1938. H. BECK 2,122,365
METHOD OF PRODUCING SHEET METAL CAGES FOR CYLINDRICAL ROLLER BEARINGS
Filed Jan. 31, 1936 2 Sheets-Sheet 1
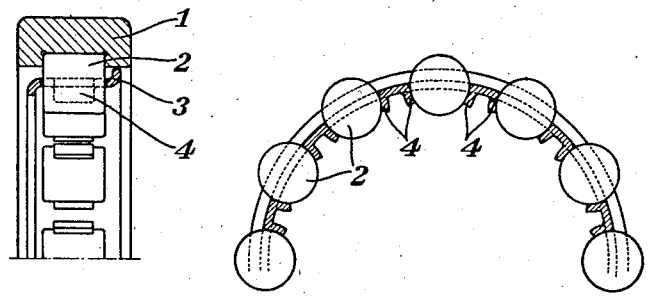
Fig.1. Fig.2.
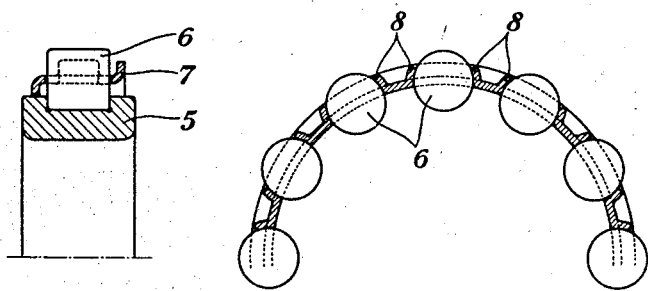
Fig.3. Fig.4.
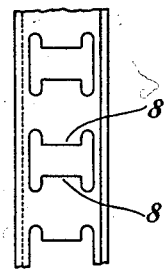 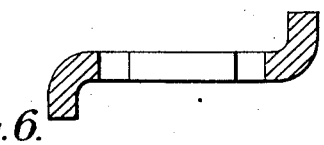
Fig.5. Fig.6.
INVENTOR.
Hans Beck
BY
his ATTORNEY.

June 28, 1938.    H. BECK    2,122,365
METHOD OF PRODUCING SHEET METAL CAGES FOR CYLINDRICAL ROLLER BEARINGS
Filed Jan. 31, 1936    2 Sheets-Sheet 2

INVENTOR.
Hans Beck
BY
his ATTORNEY

Patented June 28, 1938

2,122,365

UNITED STATES PATENT OFFICE 2,122,365

METHOD OF PRODUCING SHEET METAL CAGES FOR CYLINDRICAL ROLLER BEARINGS

Hans Beck, Stuttgart-Bad-Cannstatt, Germany, assignor to Aktiebolaget Svenska Kullagerfabriken, Goteborg, Sweden, a corporation of Sweden Application January 31, 1936, Serial No. 61,654
In Germany February 19, 1935

8 Claims. (Cl. 29—148.4)

My invention relates to improvements in the method of producing sheet metal cages for cylindrical roller bearings.

Cages for cylindrical roller bearings as hitherto used have been mainly of drilled type.

Cages of drilled type can be used both for bearings with flanges on the outer race ring and for bearings with flanges on the inner race ring, but have the disadvantage that they are rather expensive to manufacture. It is therefore desirable to produce a cage of sheet material for cylindrical roller bearings. It has, however, been found difficult to design a cage of sheet material which can be used for both of the above types of cylindrical roller bearings. If the cage is suitable for only one of the above types of bearings the number of cage types which must be kept in stock will be doubled with consequent increase in the cost of manufacture and stocking. A further requirement is that the cross section of the cage should be of such shape as to give the cage sufficient strength and stiffness, since the thickness of the material is limited because of the punching and pressing operations.

The cage according to the invention is manufactured from sheet material and has a rigid Z-shaped cross section. In its fundamental form the cage can be used both for bearings with flanges on the outer race ring and for bearings with flanges on the inner race ring. The roller pockets are provided with tongues which are adapted to be bent toward each other to retain the rollers in place after they have been inserted into the cage. For cylindrical roller bearings having flanges on the inner race ring the tongues are bent outwardly and in bearings having flanges on the outer race ring the tongues are bent inwardly. Thus only the tool for bending the tongues need be made different for the two types of roller bearings. The fundamental form of the cage is on the other hand exactly the same in both cases. The cage can, however, be designed so that in finished form it can be used for both bearing types. In that case one of the tongues at each roller pocket is bent outwardly and the other tongue is bent inwardly.

The Z-shape of the cross section of the cage gives the cage sufficient rigidity. This shape of cross section has the further advantage that it permits the introduction of a supporting tool between the cage and the flange for supporting the cage when assembling the bearing. This tool enables the cage to retain its roundness when the tongues are being closed about the rollers. The Z-shape permits the tool to be introduced either outside or inside of the cage depending on whether the tongues are bent inwardly or outwardly.

It has previously been suggested to make Z-shaped roller cages of sheet material for taper roller bearings. The conical form of the inner race ring of taper roller bearings, however, permits the roller set and the cage to be passed into place on the race way over the flange at the small end of the ring. This method of assembling the bearing cannot, however, be used in assembling cylindrical roller bearings without an additional operation. Between the two bearing types there is a further fundamental difference in that the cylindrical roller bearing is sometimes provided with flanges on the inner race ring and sometimes with flanges on the outer race ring, the bearings otherwise being identical. This is not the case with taper roller bearings. In the latter type of roller bearings there are consequently no cages adapted for use both with bearings having flanges on the inner race ring and for bearings having flanges on the outer race ring.

The accompanying drawings illustrate a number of forms of the cage according to the invention and the method preferred in assembling the bearing. In which drawings:

Figure 1 is a view in axial section illustrating a form of my improved cage applied to the rollers of a bearing having inwardly directed flanges formed on the inside of the outer race ring.

Figure 2 shows a cross section of the cage illustrated in Figure 1 and the ends of part of the rollers of the set belonging to the same bearing.

Figure 3 is a view in axial section of a form of the cage applied to the rollers of a bearing having outwardly directed flanges on the outside of the inner race ring.

Figure 4 is a cross section of the cage illustrated in Figure 3 showing the ends of part of the rollers of the set belonging to the same bearing.

Figure 5 is a side view of a portion of a blank drawn and stamped and representing the basic or fundamental part from which any one of the three forms of cage herein illustrated may be formed by simple bending operations.

Figure 6 shows an axial section of the basic or fundamental cage element shown in Figure 5.

Figure 7:
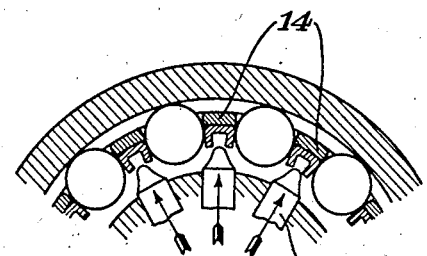
Figure 7 shows a preferred method of bending the tongues at the roller pockets of a cage mounted in a bearing having flanges on the inside of the outer race ring.

The shape of the cage and tongues before the latter are bent over is clearly indicated in Figure 5.

In Figure 1, the numeral 1 designates the outer race ring of a cylindrical roller bearing against which the cylindrical rollers 2 roll. The cage 3 has a Z-shaped cross section and tongues 4 are provided at the pockets for particularly enclosing the rollers 2. Figure 2 shows the same cage in a section perpendicular to the axis of the bearing. It is apparent from the figure that the tongues 4 have such a shape that they retain the roller 2 on the outer race ring 1, even when the inner race ring is removed. In bearings having flanges on the inner race ring the tongues 8 of the cage 7 are as shown in Figures 3 and 4 bent outwardly and in this case retain the rollers 6 on the inner race ring 5.

In both cases the fundamental or basic form of the cage, as previously explained, is the same whether the cage is used in connection with roller bearings having flanges on the outer race ring or with roller bearings having flanges on the inner race ring. The only difference between cages for the one or the other bearing type consists in the bending of the tongues inwardly or outwardly. In the manufacture of the cages the tongues are so bent that both tongues belonging to the same pocket are disposed on substantially parallel planes. This makes it possible to assemble the bearing by concentrically positioning the flanged bearing ring and the proper cage after which the rollers are introduced into the pockets from the side facing away from the bearing ring.

Figure 8:
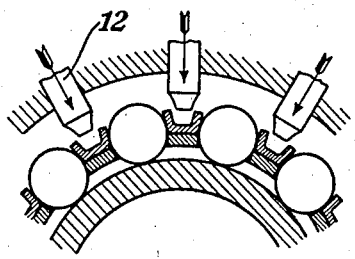
Figure 8 shows the corresponding operation for bending the tongues of a cage mounted in a bearing having flanges on the outer side of an inner race ring.
Figure 9:
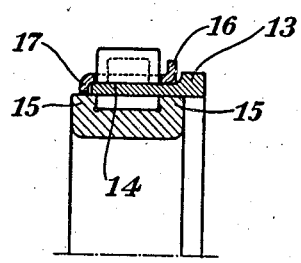
Figure 9 is a detail, principally in axial section showing the position of a supporting tool applied to a cage and bearing structure such as that illustrated in Figures 3, 4 and 8.
Figure 10:
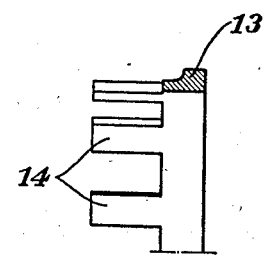
Figure 10 shows a broken away portion of the supporting tool, partly in axial section.

After one or more of the rollers have been assembled the tongues are bent to conform very closely to the shape of the roller within the appurtenant pocket. This bending is preferably done in the manner illustrated in Figures 7 and 8, by means of a tool having a number of radially movable fingers 11 and 12, which are introduced between a pair of adjacent tongues and bend the tongues so that they partly enclose the rollers in adjacent pockets. In order to prevent the cage from becoming deformed during this operation, losing its circular form, the cage may be supported by a tool 13, provided with a number of fingers 14, one for each space between the rollers. The tool 13 may have the shape of a ring provided with axially extending fingers 14. When assembling cages for bearings having flanges on the inner race ring the tool is introduced as shown in Figure 9. The fingers 14 are thereby supported by the flanges 15—15 of the inner race ring. The introduction of this tool is made possible because one flange 16 of the cage is bent outwardly. When assembling a cage for bearings having flanges on the outside of the outer race ring the tool is introduced from the side of the bearing at which the flange 17 is bent inwardly.

Having thus described my invention, I claim and desire to secure by Letters Patent:—

1. The method of producing roller cages for bearings, which consists in employing a cage for the rollers comprising a cylindrical body portion formed with pockets and having flanges at its respective sides, one of said cage flanges extending from the cylindrical body portion radially in one direction and the other cage flange extending radially in the opposite direction, the cylindrical body portion being formed with roller pockets, there being tongue members provided at both sides of each pocket, then bending the tongue members so that both tongues belonging to the same pocket extend from the same perimeter of the cylindrical body portion, then assembling the cage with a bearing ring having a race way for the rollers and integral flanges formed at each side of the race way and directed toward the body of the cage, and projecting in the same general direction from the race way as do the tongues from the body of the cage, then placing rollers in the pockets and then bending the tongues to enclose the rollers.

2. The method of producing roller cages for bearings, which consists in employing a cage for the rollers comprising a cylindrical body portion formed with pockets and having flanges at its respective sides, one of said cage flanges extending from the cylindrical body portion radially in one direction and the other cage flange extending radially in the opposite direction, the cylindrical body portion being formed with roller pockets, there being tongue members provided at both sides of each pocket, then bending the tongue members so that both tongues belonging to the same pocket extend from the same perimeter of the cylindrical body portion, then assembling the cage with a bearing ring having a race way for the rollers and integral flanges formed at each side of the race way and directed toward the body of the cage, and projecting in the same general direction from the race way as do the tongues from the body of the cage, then placing rollers in the pockets, then introducing a supporting tool between the cage and the bearing ring at the side of the cage at which the flange of the cage projects away from the bearing ring, and then bending the tongues to support the rollers, the body portion of the cage being supported on its perimeter opposite that from which the tongues project.

3. The method of producing cages for roller bearings which consists in forming a cage of basic Z shape, its central portion being formed with roller pockets provided with tongue members at each side, then inwardly bending the said tongue members and causing them to project inwardly, then placing outwardly of the cage a bearing ring having inwardly directed guide flanges at its sides, then inserting rollers in the pockets, then introducing a suitable supporting tool between the cage and the race ring and then bending the tongues to enclose the rollers.

4. The method of producing cages for roller bearings which consists in forming a cage of basic Z shape, its central portion being formed with roller pockets provided with tongue members at each side, then outwardly bending the said tongue members and causing them to project outwardly, then placing inwardly of the cage a bearing ring having outwardly directed guide flanges at its sides, then inserting rollers in the pockets, then introducing a suitable supporting tool between the cage and the race ring and then bending the tongues to enclose the rollers.

5. The method of producing cages for roller bearings, which consists in employing a cage made of a basic Z shape having a cylindrical body portion formed with roller pockets and having flanges at its respective sides, there being tongue members provided at both sides of each pocket, then bending the tongue members inwardly, then placing outwardly of the cage a bearing ring having a raceway for rollers, there being an inwardly directed integral flange formed at each side of the race way, then placing rollers in the pockets, then introducing a supporting tool between the cage and the race ring at the side of the cage in which the Z flange of the cage projects inwardly, and bending the tongues to enclose the rollers.

6. The method of producing cages for roller bearings, which consists in employing a cage made of a basic Z shape having a cylindrical body portion formed with roller pockets and having flanges at the respective sides, there being tongue members provided at both sides of each pocket, then bending the tongue members outwardly, then placing within the cage a bearing ring having a raceway for rollers, there being an outwardly directed integral flange formed at each side of the raceway, then placing rollers in the pockets, then introducing a supporting tool between the cage and the bearing ring at the side of the cage in which the Z flange of the cage projects outwardly, and bending the tongues to enclose the rollers.

7. The method of producing roller cages for bearings, which consists in employing a cage for the rollers comprising a cylindrical body portion formed with pockets and having flanges at its respective sides, one of said cage flanges extending radially in one direction and the other cage flange extending radially in the opposite direction, the cylindrical body portion being formed with roller pockets, there being tongue members provided at each side of each pocket, then bending the tongue members inwardly so that both tongues belonging to the same pocket are disposed on substantially parallel planes, then assembling the cage within a bearing ring having a race way for the rollers and integral flanges formed at each side of the race way and directed inwardly toward the body of the cage, then placing the rollers in the pockets, and then bending the tongues to enclose the rollers.

8. The method of producing roller cages for bearings, which consists in employing a cage for the rollers comprising a cylindrical body portion formed with pockets and having flanges at its respective sides, one of said cage flanges extending radially in one direction and the other cage flange extending radially in the opposite direction, the cylindrical body portion being formed with roller pockets, there being tongue members provided at both sides of each pocket, then bending the tongue members outwardly so that both tongues belonging to the same pocket are disposed on substantially parallel planes, then assembling the cage upon a bearing ring having a race way for the rollers, and integral flanges formed at each side of the race way and directed outwardly toward the body of the cage, then placing the rollers in the pockets, and then bending the tongues to enclose the rollers.

HANS BECK.